(12) United States Patent
Boehnisch et al.

(10) Patent No.: US 10,794,749 B2
(45) Date of Patent: Oct. 6, 2020

(54) DETERMINING A FILL LEVEL OF A HYDRODYNAMIC CLUTCH

(71) Applicant: VOITH PATENT GMBH, Heidenheim (DE)

(72) Inventors: Juergen Boehnisch, Satteldorf (DE); Marco Fuchs, Crailsheim (DE); Thomas Ohr, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 93 days.

(21) Appl. No.: 16/306,745

(22) PCT Filed: May 4, 2017

(86) PCT No.: PCT/EP2017/060649
§ 371 (c)(1),
(2) Date: Dec. 3, 2018

(87) PCT Pub. No.: WO2017/207206
PCT Pub. Date: Dec. 7, 2017

(65) Prior Publication Data
US 2019/0128724 A1    May 2, 2019

(30) Foreign Application Priority Data
Jun. 3, 2016    (DE) .................. 10 2016 209 756

(51) Int. Cl.
*G01F 23/00*    (2006.01)
*G01F 23/02*    (2006.01)
(Continued)

(52) U.S. Cl.
CPC ...... *G01F 23/0069* (2013.01); *G01F 23/0061* (2013.01); *G01F 23/02* (2013.01); *G01F 23/292* (2013.01); *G06K 9/00624* (2013.01); *G06T 7/13* (2017.01); *G06T 7/62* (2017.01); *G06T 7/70* (2017.01)

(58) Field of Classification Search
None
See application file for complete search history.

(56) References Cited

U.S. PATENT DOCUMENTS

| 5,414,778 A | 5/1995 | Schwartz et al. |
| 6,098,029 A | 8/2000 | Takagi et al. |
| (Continued) | | |

FOREIGN PATENT DOCUMENTS

| DE | 879319 C | 6/1953 |
| DE | 3531987 A1 | 4/1987 |
| (Continued) | | |

OTHER PUBLICATIONS

Machine Translation JP 4731385 B2 (Year: 2011).*

*Primary Examiner* — Michelle M Entezari
(74) *Attorney, Agent, or Firm* — Laurence A. Greenberg; Werner H. Stemer; Ralph E. Locher

(57) ABSTRACT

A device for filling a hydrodynamic coupling with operating fluid and a method for filling a constantly filled hydrodynamic coupling during commissioning and/or for checking or setting a fill level with operating fluid. The device and the method provide the use of image recognition, by way of which an inspection window can be recognized and by way of which a position of the inspection window can be set.

15 Claims, 1 Drawing Sheet

(51) Int. Cl.
*G01F 23/292* (2006.01)
*G06T 7/62* (2017.01)
*G06T 7/13* (2017.01)
*G06T 7/70* (2017.01)
*G06K 9/00* (2006.01)

(56) References Cited

U.S. PATENT DOCUMENTS

| | | | |
|---|---|---|---|
| 6,793,075 B1* | 9/2004 | Jeter | A47G 19/2272 206/459.1 |
| 2005/0107666 A1* | 5/2005 | Glukhovsky | A61B 1/041 600/117 |
| 2006/0017821 A1* | 1/2006 | Garvey | H04N 5/77 348/231.3 |
| 2007/0251921 A1* | 11/2007 | Herchen | G01F 1/7086 216/84 |
| 2007/0296961 A1* | 12/2007 | Sekine | G01M 11/064 356/213 |
| 2008/0173088 A1 | 7/2008 | Quill | |
| 2009/0103841 A1* | 4/2009 | Uenosono | F16C 33/726 384/100 |
| 2010/0087999 A1 | 4/2010 | Neelakantan et al. | |
| 2011/0266286 A1 | 11/2011 | Schmauder et al. | |
| 2012/0158264 A1 | 6/2012 | Kuras et al. | |
| 2016/0046278 A1* | 2/2016 | Matsuzaki | B60W 10/11 701/22 |

FOREIGN PATENT DOCUMENTS

| | | |
|---|---|---|
| DE | 202009004331 U1 | 7/2009 |
| DE | 102009043389 A1 | 4/2010 |
| DE | 102008060165 A1 | 6/2010 |
| DE | 112011104480 T5 | 10/2013 |
| JP | 4731385 B2 * | 7/2011 |
| WO | 2010080340 A1 | 7/2010 |

* cited by examiner

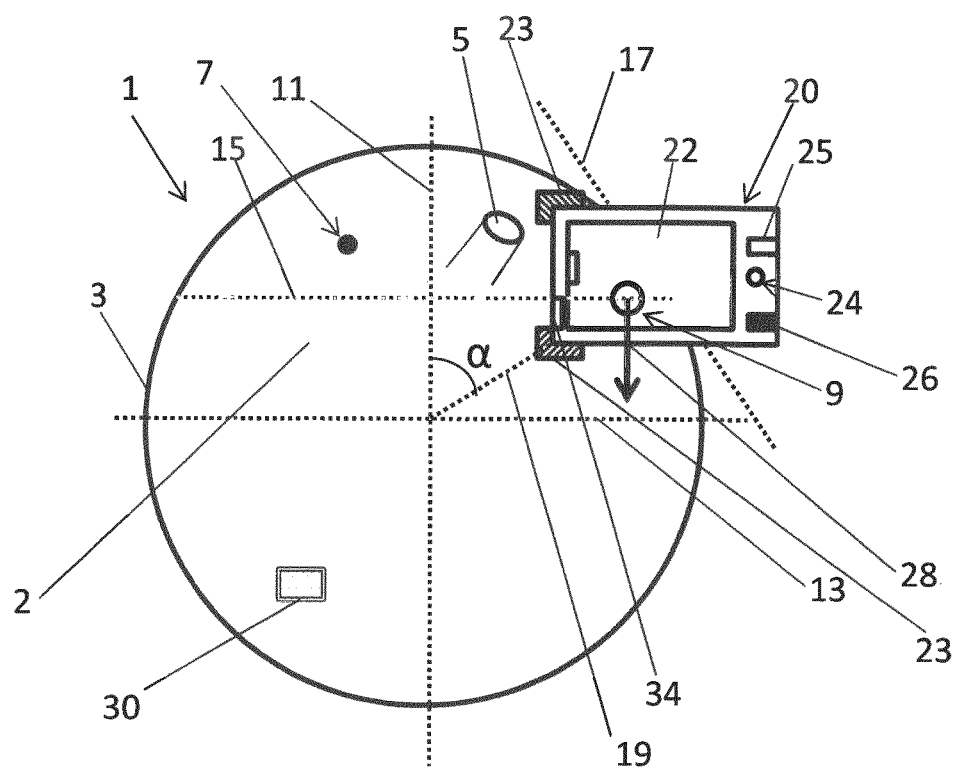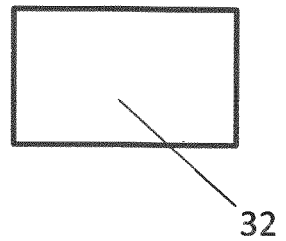

DETERMINING A FILL LEVEL OF A HYDRODYNAMIC CLUTCH

BACKGROUND OF THE INVENTION

Field of the Invention

The invention relates to a method and a device for determining a fill level of a hydrodynamic coupling.

Hydrodynamic couplings, also termed a turbo coupling, are known from the company Voith for example. Hydrodynamic couplings contain two circumferential blade wheels, which are termed the pump wheel and turbine wheel or else the primary wheel and secondary wheel. The operating medium flows from the pump wheel into the turbine wheel and from the turbine wheel back into the pump wheel. The quantity and the type of the operating fluid substantially determine the behavior of the hydrodynamic coupling. Too great a fill quantity leads to a higher loading of the drive motor and the machine during start-up and to a higher start-up moment. Too low a fill quantity leads to a higher thermal loading of the coupling and to a lower start-up moment.

In hydrodynamic couplings, the constantly filled hydrodynamic couplings are in particular filled with the operating medium prior to commissioning. The hydrodynamic couplings are generally delivered unfilled. Prior to first commissioning, filling of the hydrodynamic coupling is carried out. Refilling operating fluid may also be necessary during operation. Refilling may be necessary due to leaks in particular. Also, replacement of the operating medium may be provided regularly and refilling after thermal loading may also be provided.

For example, it is described in the installation and operating instructions, of the company Voith, for turbo couplings with constant filling, that the coupling is rotated until the filler plug of the hydrodynamic coupling is located right at the top. If the coupling comprises a plurality of filler plugs, the filler plug which is closest to the inspection screw is to be positioned at the top. The filler plug is unscrewed. Subsequently, for pressure equalization, a further upper opening is opened, e.g. a fusible plug located at the top is unscrewed. Then a prescribed quantity of operating fluid, e.g. water or oil, is poured in via the filler plug opening. Subsequently, the openings, filling opening and fusible plug are closed. Subsequently, the coupling is rotated until the operating fluid is visible at an inspection screw which is provided. The number of flange screws from the inspection screw to the vertical axis is determined. The first screw is the one whose center line is located after the line of intersection through the inspection screw in the counting direction. The number determined is noted for later fill-level checks.

It is also possible that a height dimension or angle dimension of the inspection window is noted as reference value during filling and subsequently these dimensions are called upon for refilling.

During a fill-level check, the coupling is rotated until the operating fluid is just visible at the inspection screw. The number of flange screws from the inspection screw to the vertical axis is determined. The number of screws determined is compared with the information in the operating instructions or with the dimensions determined after the first filling. If there is a deviation, the fill quantity is to be corrected.

Instead of the method with the number of screws, an appropriate position on the coupling or on the housing can also be marked and this can be used as a reference position. If, once the positioning of the coupling is assumed, the operating fluid is not half visible in the inspection window, then the fill quantity is to be corrected.

SUMMARY OF THE INVENTION

The invention is based on the object of providing a method, using which filling of a hydrodynamic coupling is facilitated. Furthermore, the invention is based on the object of it being possible to easily check the filling.

The solution according to the invention is characterized by the features of the independent claims. Advantageous configurations are reproduced in the dependent claims.

By means of the measure of using a device with a mobile device with a camera, a device is provided, using which filling of a hydrodynamic coupling is facilitated. By means of the camera and image recognition, it is possible to detect an inspection window of the hydrodynamic coupling. The mobile device is provided with a module for determining the position of the inspection window. Thus, the position of the inspection window can be recorded, particularly even in the case of a half visible fill level. Furthermore, it is possible to position the inspection window at a predetermined position. To do this, e.g. a mark can be provided on the coupling, or in the case of a known predetermined desired position, positioning at this position can be provided.

In some use cases, the hydrodynamic coupling is surrounded by a housing and the inspection window may be difficult to access as a result. By means of the mobile device, a recording of the position of the inspection window can take place by means of the camera and image recognition in that the mobile device with the camera is used for recording the hydrodynamic coupling. The position of the inspection window can then subsequently be determined by means of the module for determining the position of the inspection window. Further measures can then be provided based on the determined position of the inspection window.

In a preferred exemplary embodiment, the mobile device is provided with a gravitational sensor, so that the recorded image can be aligned with respect to the detected direction of the effective gravitational force. A precise positioning of the mobile device during image recording is therefore not required. Therefore, an alignment of the recorded image can also take place if no fluid level is visible in the inspection window. In addition, in the case of a small inspection window, the direction of the effective gravitational force can only be determined imprecisely on the basis of the fluid level. The alignment of the recorded image can always be carried out independently of the position of the inspection window by means of a gravitational sensor.

In a preferred embodiment, it is provided that the image recognition detects an outer contour of the housing. The outer contour can be called upon when determining the position of the inspection window in the module for determining the position of the inspection window. In addition, it may be provided to draw a conclusion about the type/model of the coupling on the basis of the outer contour. The outer contour can be helpful in particular in the case of an angular position of the inspection window. In the hydrodynamic couplings, the contour in section is rotationally symmetrical perpendicularly to the axis of rotation. An angular position of the inspection window with respect to the vertical, which corresponds to the direction of the effective gravitational force, can be effected on the basis of the tangent of the outer contour.

In a preferred embodiment, it is provided that a data memory is assigned to the device. The data memory can be provided in the mobile device itself or it may be provided that the mobile device accesses an external data memory. The external data memory may be a central data memory, e.g. of the coupling manufacturer, in which the data of the various coupling types are stored. However, this may also be an external data memory arranged on the coupling itself. Thus, a data memory can be provided on the coupling, in which the data of the coupling, such as in particular the desired fill quantity and desired position of the inspection window with half visible fluid level when filling with the desired fill quantity, are stored. A data memory arranged on the coupling itself may be an only readable or a readable and writeable data memory. If the data memory is writeable, then the position of the inspection window with half visible fill level with the desired fill quantity after commissioning can be saved there. Service intervals can also be stored in the data memory.

In a preferred embodiment, it is provided that the mobile device has a display. As a result, the determined position of the inspection window and/or also a predetermined desired position can be optically displayed to the user in relation to the current actual position. It may also be provided that the display can also be used as an input unit of the mobile device. Displays of this type are termed touchscreens. Furthermore, an acoustic signalling device can be provided as output device. The acoustic signalling device can be provided alternatively or additionally to the optical signalling device. Acoustic signals, e.g. for positioning the inspection window at the desired position, can be provided for the user by means of the acoustic signalling device. Thus, acoustic instructions can be transmitted to the user easily, particularly even if a display is not accessible at that moment, e.g. covered by a housing, for the user.

In a preferred embodiment, it is provided that the mobile device comprises a data transmission device for sending and receiving electronic data. By means of this data transmission device, which can be realized wirelessly, it is possible to read data about the present coupling type from external data memories. Furthermore, it is possible to also save information after first commissioning and about servicing operations undertaken in external memories. Trigger signals can also be sent. If an external pump for filling the hydrodynamic coupling is connected to this coupling for example, then a trigger signal can be sent to the pump by means of the mobile device when a predetermined desired fill level is detected. Further filling of the coupling can be stopped automatically.

By means of the method according to the invention, convenient filling of a constantly filled hydrodynamic coupling is possible during commissioning and/or checking or setting a fill level is possible using a device according to one of the preceding claims. In the method, the position of the inspection window with half visible fill level is detected by means of image recognition. Furthermore, recognition of the outer contour of the housing of the hydrodynamic coupling is carried out by means of image recognition. In this case, the inspection window is contained in the image section called upon for determining the outer contour. During commissioning, with the desired quantity of operating fluid poured in, it is therefore possible to detect the position of the inspection window with half visible fill level in a convenient manner. It is also possible in a convenient manner, after commissioning, to determine whether the coupling is sufficiently filled with operating fluid by determining the position of the inspection window with half visible fill level.

A preferred method is provided for relating the outer contour of the housing of the coupling to the effective gravitational force. An angular position of the inspection window can be determined as a result. In a preferred embodiment, the tangent at the outer contour and the normal to the tangent, which centrally intersects the inspection window, is determined and then the angle between the direction of the effective gravitational force and the normal is determined.

In a preferred method for determining a fill level, it is provided to determine the coupling type. The determination of the coupling type can for example take place by reading a nameplate or by reading a provided data memory or else by detecting the outer contour and subsequent comparison of the various coupling types in the database. Furthermore, it is provided to optically detect the inspection window with half visible fill level. The detection can take place by means of a mobile device with camera function. Subsequently, the optical data are evaluated and the position of the inspection window is determined on the basis thereof. The actual fill quantity of the hydrodynamic coupling is derived from the position of the inspection window. The actual fill quantity is compared with a predetermined desired fill quantity and a refill quantity or quantity to be emptied is output.

In a preferred embodiment, it is provided to use the method for setting a predetermined fill level. The coupling type is determined in this embodiment. The coupling type can be input or else read automatically or else determined on the basis of the optical appearance of the coupling. The inspection window is positioned at a predetermined position using image recognition. In this case, it may be provided that signals are output, by means of which the user is supported for adjusting the inspection window to the predetermined position. When a desired position is assumed, operating fluid is refilled until a fill level is half recognizable in the inspection window. This process can also be supported by means of optical image recognition.

One configuration of the method consists in the angular position of the angle (a) between the vertical and the normal to the tangent of the outer contour being determined during the determination of the position of the inspection window, wherein the normal intersects the inspection window centrally and intersects the tangent at right angles at the point of intersection of the tangent with the outer contour of the housing. As a result, it is not necessary to determine the axis of rotation or the center of the coupling. It is sufficient to record only one image section in which the inspection window and the outer contour are visible. The precision can be increased by choosing a smaller image section.

One configuration of the method consists in a trigger signal being sent out when it is known that the half fill level has been reached or the desired position of the inspection window has been assumed. Thus, it is possible to signal to the user that the desired position has been reached or a position of the inspection window with half visible fill level has been reached, even if the user cannot see into the inspection window. This is very helpful in the case of couplings which are difficult to access in particular.

For example, the coupling may be surrounded with a housing, as a result of which the inspection window can only be accessed with difficulty. In such a case, a holder may be provided for fastening the mobile device. The mobile device is securely connected to the coupling by means of the holder and is entrained in rotation with the coupling housing. An image of the inspection window can be recorded by the mobile device. On the one hand, the recordings of the inspection window can be transmitted continuously, e.g. to a display, or when a half fill level is reached, this can be transmitted and/or signalled. For example, approaching a predetermined desired position, such as the half fill level in the inspection window, can be signalled by means of an acoustic signal. When the desired position is assumed, a determination of the angular position of the inspection window or the fill level may be provided therefrom. A refill quantity or drainage quantity, also termed correction fill quantity, can be transmitted on the basis of this information. For example, a correction fill quantity can be displayed on the display or announced by means of a loudspeaker. It can also be provided that the determined correction fill quantity is transmitted directly to a filling unit connected to the coupling and filling or a correction of the filling takes place automatically.

BRIEF DESCRIPTION OF THE DRAWING

The solution according to the invention is explained in the following on the basis of a FIGURE. In detail, the following is illustrated therein:

The FIGURE is a schematic illustration of the hydrodynamic coupling.

DESCRIPTION OF THE INVENTION

The FIGURE schematically shows a hydrodynamic coupling 1. The hydrodynamic coupling has a rotationally symmetrical outer contour 3. In this illustration, the rotational axis runs through the center point of the housing delimited by the outer contour 3. At this center point, a vertical axis 11 (12 o'clock position) intersects with a horizontal axis 13. The hydrodynamic coupling has a filling opening 5 and an inspection window 9. A further opening 7, which can be opened, may be a fusible plug which is provided. This further opening 7 can be opened during filling of the coupling 1, in order to facilitate the filling through the filling opening. The fill level is illustrated with a dashed line 15. The coupling 1 is filled with operating fluid 2 below this dashed fill level line 15. A tangent 17 is drawn in at the outer contour 3, wherein a normal 19 to this tangent 17 centrally intersects the inspection window 9. The normal 19 intersects the tangent 17 at right angles. The housing is provided with a nameplate in the form of an RFID chip, in which the technical data of the coupling are stored. Thus, it is no longer necessary to provide manuals or datasheets in paper form. That is also advantageous in particular if a plurality of such hydrodynamic couplings are arranged in an arrangement or a hall. Locating the correct information is then no longer necessary. The coupling information can also be provided in a data memory, with a transmitting and if appropriate receiving unit in particular, which data memory is cast in the housing.

A mobile device 20 is shown which has a camera 24. The image section 21 recorded by the camera can be illustrated on a display 22 of the mobile device 20. The inspection window 9 is shown in the display 22. The angle which the inspection window 9 encloses with the vertical 11 is labelled with α. A gravitational sensor 26 is provided in the mobile device 20 and the effective gravitational force is illustrated as an arrow 28. Furthermore, the mobile device 20 comprises a module 25 for determining the position of the inspection window 9. The mobile device comprises an output device 23 in the form of a loudspeaker. The display 22 also constitutes an output device. The mobile device 20 is provided with a data transmission device 34 with a receiving and transmitting device for the wireless transmission of data and trigger signals and for receiving data.

Using the mobile device 20, a desired fill quantity can be obtained via an NFC function of the mobile device 20 in the case of a data memory provided at the coupling 1 by reading the data memory. In this case, the data memory may be integrated into the nameplate 30 and/or a QR code, which can be read by the camera 24, can be provided as data memory.

Access to an external data memory 32, such as a cloud or an external server, can also be provided by means of the mobile device 20. The actual filling is effected by using the camera 24 and the gravitational sensor 26 of the mobile device 20. To this end, it may be provided in a first step to determine the coupling size and type by means of optical detection of the coupling 1 by means of the camera 24. Alternatively, coupling size and type can also take place as a dataset by means of NFC or QR code scanning or by means of manual input.

In a second step, the actual filling with operating fluid is determined. To this end, after coupling alignment has taken place, an image of the coupling 1 is recorded by means of the camera 24, so that the fill level is visible behind the inspection window. By determining the tangent 17 of the coupling outer contour 3 and the associated normal 19 through the inspection window, the angular position of the inspection window 9 is determined in connection with the vertical axis 11 determined by means of the gravitational sensor 26. Alternatively to the use of a gravitational sensor 26, the alignment of the fill level line 15 can also be called upon in order to determine a horizontal and vertical and therefore the angle with respect to the vertical. The fill quantity can be calculated by means of an algorithm, taking account of the angular position and the coupling size or coupling type.

For couplings in which it is not possible to see into the inspection window 9, e.g. through housings, one functionality of the mobile device 20 may consist in recognizing and signalling the inspection window 9 with half visible operating means when rotating the coupling 1, so that the user of the mobile device 20 is informed that the inspection window 9 then corresponds to a provided positioning. The mobile device 20 can be fastened on the coupling 1 by means of a holder 23 provided on the coupling 1 and record an image of the inspection window 9 by means of the camera 24. The recorded image is transmitted to a display 22 and the user receives the images of the inspection window 9 directly and as a result even recognize a half fill level in the inspection window 9. For an exact positioning to this position, signalling, e.g. by specifying an angle of rotation or an acoustic signal, which accompanies exact positioning to the desired position, can be provided.

REFERENCE LIST

1 Hydrodynamic coupling
2 Operating fluid
3 Outer contour of the coupling
5 Filling opening
7 Further opening, opening for fusible plug
9 Inspection window
11 Vertical axis
13 Horizontal axis
15 Fill level
17 Tangent at the outer contour
19 Normal to the tangent
20 Mobile device
21 Image section
22 Output unit/display 23 Holder
24 Camera
25 Module
26 Gravitational sensor
28 Gravitational force
30 Nameplate
32 Data memory
34 Data transmission device

The invention claimed is:

1. A device for filling a hydrodynamic coupling with operating fluid, the hydrodynamic coupling having a substantially vertical inspection window through which a fill level of the operating fluid is visible, and a fill level cuts horizontally through the inspection window when the hydrodynamic coupling assumes a given rotational position, the device comprising:
    a mobile device having a camera for optically acquiring the hydrodynamic coupling and having image recognition for detecting the inspection window of the hydrodynamic coupling and a module for determining a rotational position of the hydrodynamic coupling when the fill level line cuts centrally through the inspection window and for determining the fill level of the hydrodynamic coupling from the rotational position of the hydrodynamic coupling.

2. The device according to claim 1, wherein said mobile device comprises a gravitation sensor and said module is configured to determine the rotational position of the hydrodynamic coupling relative to a vertical determined by said gravitation sensor.

3. The device according to claim 1, further comprising a data memory for storing desired positions of the inspection window and/or fill quantities as a function of positions of the inspection window for a fill level that is visible in half the inspection window with respect to various coupling types.

4. The device according to claim 1, wherein said mobile device includes a display.

5. The device according to claim 1, wherein said mobile device includes an output device.

6. The device according to claim 5, wherein said output device is at least one device selected from the group consisting of an acoustic signalling device and an optical signalling device.

7. The device according to claim 1, wherein said mobile device comprises a data transmission device for sending and receiving electronic data.

8. The device according to claim 1, wherein the coupling is equipped with a holder for mounting said mobile device.

9. A method of filling a constantly filled hydrodynamic coupling during commissioning and/or for checking or setting a fill level, the method comprising:
    providing a device according to claim 1;
    rotating the hydrodynamic coupling until the fill level is visible in an inspection window;
    detecting with image recognition a position of the inspection window with fill level visible in half the inspection window and causing the image recognition to recognize an outer contour of a housing of the hydrodynamic coupling, wherein the inspection window is contained in an image section called upon for detecting the outer contour of the housing.

10. The method according to claim 9, which comprises relating the detected outer contour to an effective gravitational force.

11. The method according to claim 9 for determining the fill level, the method comprising:
    determining a coupling type of the hydrodynamic coupling;
    optically detecting the inspection window with the half visible fill level;
    determining the position of the inspection window;
    determining an actual fill quantity of the hydrodynamic coupling on a basis of the position of the inspection window;
    comparing the actual fill quantity with a predetermined, desired fill quantity; and
    outputting a refill quantity or a drainage quantity.

12. The method according to claim 9 for setting a predetermined fill level, the method comprising:
    determining a coupling type of the hydrodynamic coupling;
    positioning the inspection window at a predetermined position using image recognition; and
    refilling operating fluid until a fill level is visible in half of the inspection window.

13. The method according to claim 9, wherein the step of determining the position of the inspection window comprises determining an angular position of an angle between a vertical and a normal to a tangent of an outer contour, wherein the normal intersects the inspection window centrally and intersects the tangent perpendicularly at a touch point of the tangent with the outer contour of the housing.

14. The method according to claim 9, which comprises outputting a trigger signal when it is known that the half fill level has been reached or the desired position of the inspection window has been assumed.

15. A method of filling a constantly filled hydrodynamic coupling during commissioning and/or for checking or setting a fill level, the method comprising:
    providing a device for filling the hydrodynamic coupling with operating fluid, the device including a mobile device having a camera for optically acquiring the hydrodynamic coupling and having image recognition for detecting an inspection window of the hydrodynamic coupling and a module for determining a position of the inspection window of the hydrodynamic coupling;
    detecting with image recognition a position of the inspection window with th fill level visible in half the inspection window and causing the image recognition to recognize an outer contour of a housing of the hydrodynamic coupling, wherein the inspection window is contained in an image section called upon for detecting the outer contour of the housing; and
    determining an angular position of an angle between a vertical and a normal to a tangent of an outer contour, wherein the normal intersects the inspection window centrally and intersects the tangent perpendicularly at a touch point of the tangent with the outer contour of the housing.

* * * * *